US012669639B2

(12) United States Patent
Shimizu et al.

(10) Patent No.: US 12,669,639 B2
(45) Date of Patent: Jun. 30, 2026

(54) INPUT COUPLING GRATINGS FOR WAVEGUIDE-BASED DISPLAYS

(71) Applicant: SONY GROUP CORPORATION, Tokyo (JP)

(72) Inventors: Kazue Shimizu, Kanagawa (JP); Christophe Peroz, Tokyo (JP); Sebastien De Cunsel, Atsugi (JP)

(73) Assignee: Sony Group Corporation, Tokyo (JP)

( * ) Notice: Subject to any disclaimer, the term of this patent is extended or adjusted under 35 U.S.C. 154(b) by 78 days.

(21) Appl. No.: 17/992,538

(22) Filed: Nov. 22, 2022

(65) Prior Publication Data

US 2024/0168214 A1 May 23, 2024

(51) Int. Cl.
*F21V 8/00* (2006.01)

(52) U.S. Cl.
CPC ........... *G02B 6/0026* (2013.01); *G02B 6/005* (2013.01); *G02B 6/0068* (2013.01)

(58) Field of Classification Search
CPC .............................. G02B 6/0026; G02B 6/005
See application file for complete search history.

(56) References Cited

U.S. PATENT DOCUMENTS

| | | | | |
|---|---|---|---|---|
| 10,983,275 B2 * | 4/2021 | Popovic | ................. | G02B 6/305 |
| 2015/0016777 A1 * | 1/2015 | Abovitz | ............. | G02B 27/0093 |
| | | | | 385/37 |
| 2015/0178939 A1 * | 6/2015 | Bradski | .................. | H04N 13/00 |
| | | | | 345/633 |
| 2015/0346490 A1 * | 12/2015 | Tekolste | ............. | G02B 27/0172 |
| | | | | 359/566 |
| 2016/0076731 A1 * | 3/2016 | Mönch | ............... | G02B 19/0066 |
| | | | | 362/97.1 |
| 2017/0269297 A1 * | 9/2017 | Popovic | .................. | G02B 6/34 |
| 2017/0322418 A1 * | 11/2017 | Lin | ....................... | H04N 13/344 |
| 2018/0052501 A1 * | 2/2018 | Jones, Jr. | ............. | G02B 6/0016 |
| 2019/0056544 A1 * | 2/2019 | Bahabad | ................ | G02B 5/203 |
| 2020/0225586 A1 * | 7/2020 | Feldmann | ........... | G03F 7/70575 |
| 2021/0072437 A1 | 3/2021 | Singh | | |
| 2022/0196480 A1 * | 6/2022 | Ang | ........................ | G01J 5/045 |
| 2022/0365482 A1 | 11/2022 | Yu | | |

FOREIGN PATENT DOCUMENTS

| | | |
|---|---|---|
| CN | 112083569 A | 12/2020 |
| CN | 112285926 A | 1/2021 |
| CN | 112859341 A | 5/2021 |
| CN | 114859555 A | 8/2022 |
| WO | WO 2016/161175 | 10/2016 |
| WO | WO 2017/193012 | 11/2017 |
| WO | WO 2018/140651 | 8/2018 |
| WO | WO-2018160506 A1 | 9/2018 |

* cited by examiner

*Primary Examiner* — Yi Yang

(74) *Attorney, Agent, or Firm* — SHERIDAN ROSS P.C.

(57) ABSTRACT

An input coupling grating (ICG) for a waveguide-based display comprises an input region that receives light and a plurality of unit cells. Each unit cell includes photonic structures arranged at a pitch. The photonic structures of at least one first unit cell have at least one different structural characteristic than the photonic structures of at least one second unit cell.

14 Claims, 12 Drawing Sheets

INPUT COUPLING GRATINGS FOR WAVEGUIDE-BASED DISPLAYS

FIELD

Example embodiments relate to input coupling gratings (ICGs) for waveguide-based displays.

BACKGROUND

Waveguide-based displays may be used for near-eye display devices such as head mounted display (HMD) devices in augmented reality (AR) and/or mixed reality (MR) applications. Coupling of light at the input and the output of a waveguide affects the quality of image as seen by a user of a HMD.

SUMMARY

An illustrative embodiment is directed to an input coupling grating (ICG) for a waveguide-based display. The ICG comprises an input region that receives light and a plurality of unit cells. Each unit cell includes photonic structures arranged at a pitch. The photonic structures of at least one first unit cell have at least one different structural characteristic than the photonic structures of at least one second unit cell.

Another illustrative embodiment is directed to a waveguide-based display comprising a waveguide and at least one input coupling grating (ICG) coupled to the waveguide. The ICG includes an input region that receives light and a plurality of unit cells. Each unit cell includes photonic structures arranged at a pitch. The photonic structures of at least one first unit cell have at least one different structural characteristic than the photonic structures of at least one second unit cell. The waveguide-based display further comprises an output coupling grating (OCG) coupled to the waveguide that outputs light to an eyebox.

Yet another illustrative embodiment is directed to an input coupling grating (ICG) for a waveguide-based display. The ICG includes an input region that receives light, and a plurality of photonic structures arranged at a substantially same pitch and divided into unit cells. At least one structural characteristic of photonic structures in a unit cell differs compared to photonic structures in other unit cells.

DETAILED DESCRIPTION

Photonic waveguides are promising optical building blocks for the development of Augmented Reality (AR)/ Mixed Reality (MR) displays. Photonic waveguides employ multiple diffractive optical elements to replicate an image generated by optical engine (light source) and display the image to a user's eyes. Photonic waveguides have three main functionalities: input pupil coupling, pupil replication (or expansion), and output pupil coupling. One of the promising optical engine architectures to generate the virtual image is the use of an emissive display that employs Light Emitting Diode (LED) (e.g., organic LED (OLED), microbleed, and the like) or laser technology. An emissive display typically uses larger input pupil sizes (e.g., an input coupling grating (ICG) area of $A_{ICG}>5$ mm$^2$) which can contain several colors (wavelengths of light) spatially distributed. These two characteristics may limit the overall coupling efficiency of the ICG given that a larger input pupil size increases the losses associated with specular reflection efficiency (also called re-interaction losses). The diffraction coupling efficiency (referred to herein as $R_1$) and the specular reflection efficiency (referred to herein as $R_2$) of the ICG are also intrinsically spectrally dependent.

Related art solutions include mitigating $R_2$ losses by increasing the thickness of the waveguide and/or adding coatings on the ICG for transmissive a configuration. However, the related art solutions are not satisfactory and are accompanied by additional constraints (e.g., larger devices). Inventive concepts propose ICGs with high efficiency for large pupil size and color multiplexing. An ICG according to inventive concepts may be composed of individual diffractive unit cells 1 to n, with each unit cell including a set of photonic structures that have a unique angular coupling efficiency response for the diffractive order ($R_1''$) and for the specular re-interaction ($R_2''$). Individual unit cells can be also tuned for a specific wavelength for color multiplexing inside a single ICG. The pitch of the photonic structures may be kept the same for all the unit cells over the full ICG area. A high refractive index coating may be used to control both ($R_1''$, $R_2''$). Individual unit cells can be also tuned for a specific wavelength or range of wavelengths (e.g., green light) to facilitate color multiplexing. In at least one embodiment, the photonic structures of at least one first unit cell have at least one different structural characteristic than the photonic structures of at least one second unit cell. In some examples, the at least one different structural characteristic corresponds to the photonic structures in the at least one first unit cell having a different shape than the photonic structures in the at least one second unit cell.

Figure 1:
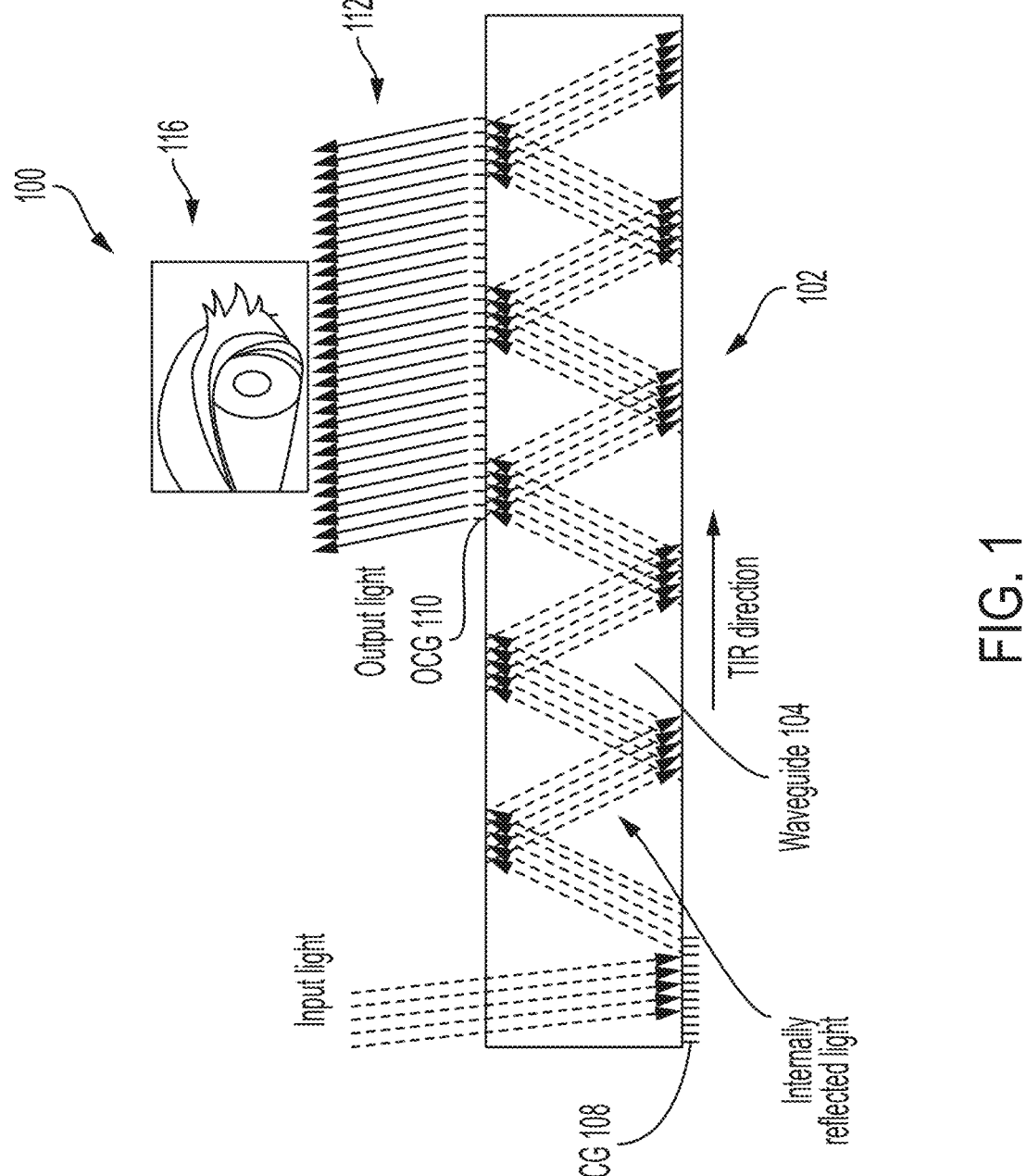
FIG. 1 is a block diagram of a system according to at least one example embodiment.

FIG. 1 is a block diagram of a system 100 including a display device 102 according to at least one example embodiment. The display device 102 may be a waveguide-based display and include a waveguide 104, an input coupling grating (ICG) 108, an output coupling grating (OCG) 110, and an eyebox 112 that outputs light to a user 116.

Figure 12:
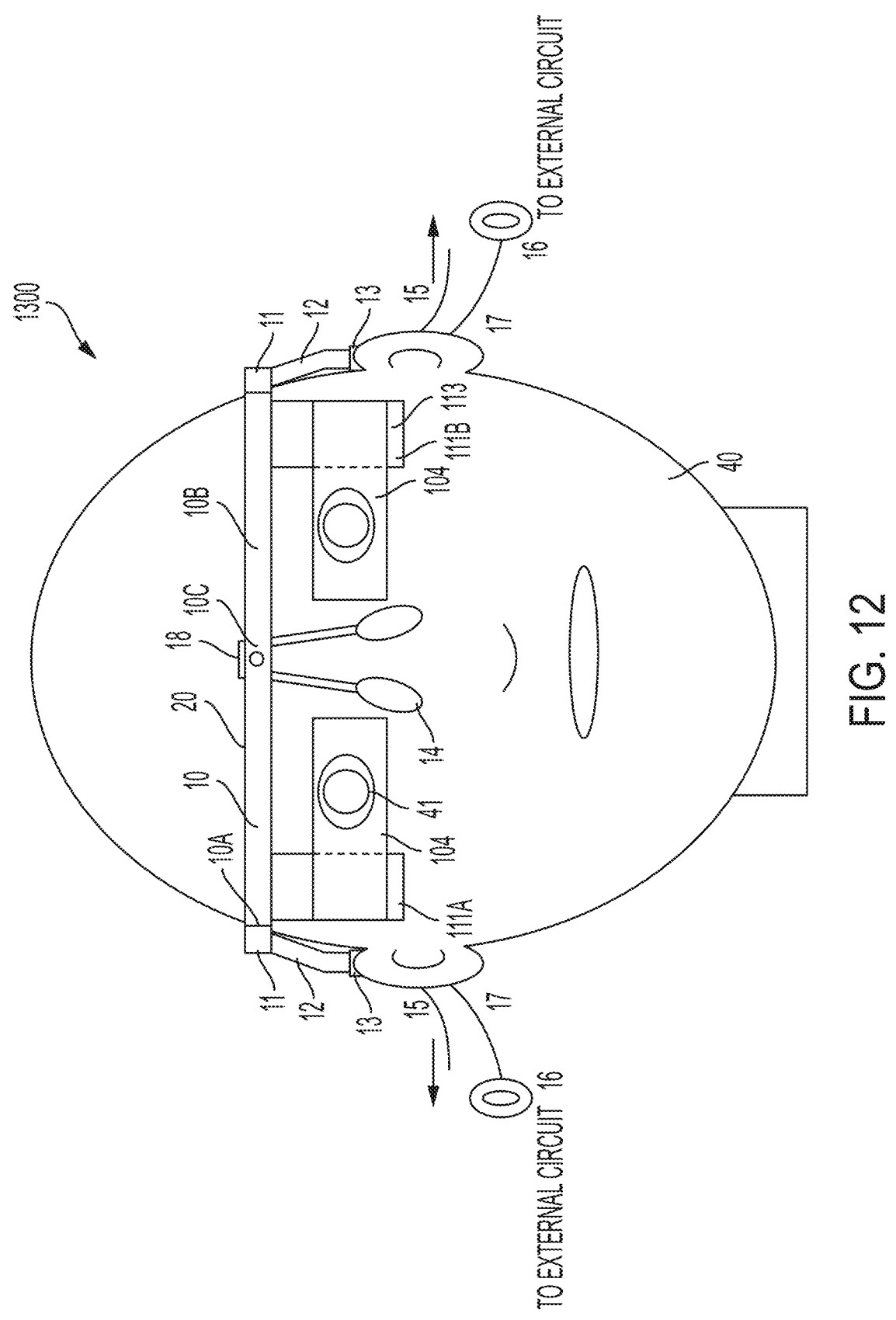
FIG. 12 illustrates a schematic view of a head mounted display (HMD) according to at least one example embodiment.

The waveguide 104 receives input light incident on a first surface of the waveguide 104 from a light source or an image generating device (not shown, but see FIG. 12 for additional detail of an image generating device). The received light is received by an input region of the ICG 108 on a first surface of the waveguide 104 and redirected (e.g., diffracted) at a propagation angle for internal reflection (e.g., total internal reflection (TIR)) within the waveguide 104. The internally reflected light may travel within the waveguide 104 before encountering OCG 110 at a second surface of the waveguide 104. The waveguide 104 may be fixed to or on a substrate or base (not illustrated). The OCG 110 has a structure that diffracts at least some of the internally reflected light to an eyebox 112 of the display device 102 as output light for viewing by the user 116. An area of the waveguide 104 located between the ICG 108 and OCG 110 may correspond to an expansion area. The input light may be generated by the light source under control of image processing circuitry (not shown) or an image generating device that controls the light source to output light in a manner that displays a still image and/or moving images to the user 116 through the eyebox 112, thereby providing an AR image or MR image to the user 116. The eyebox 112 may include an area or volume in which a user's eye will receive a view of the output light. The light source may comprise any suitable light source used for diffractive waveguide applications, for example, one or more light emitting diodes (LEDs) or other light source coupled with one or more lenses and/or prisms that direct light to the waveguide 104.

The above mentioned image processing circuitry and image generating device may comprise a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the image processing circuitry may comprise hardware, such as an application specific integrated circuit (ASIC). Other non-limiting examples of the image processing circuitry include an Integrated Circuit (IC) chip, a Central Processing Unit (CPU), a Graphics Processing Unit (GPU), a microprocessor, a Field Programmable Gate Array (FPGA), a digital signal processor (DSP), a collection of logic gates or transistors, resistors, capacitors, inductors, diodes, or the like. Some or all of the image processing circuitry may be provided on a Printed Circuit Board (PCB) or collection of PCBs. It should be appreciated that any appropriate type of electrical component or collection of electrical components may be suitable for inclusion in the image processing circuitry.

The waveguide 104 may comprise any suitable material for diffractive waveguide applications, for example, glass, plastic, polymer, or other suitable organic or inorganic optical material. The waveguide 104 may be implemented in any suitable manner. For example, the waveguide 104 may comprise a core and one or more cladding layers, where the core and the cladding layer(s) have different dielectric constants. In another example, the waveguide 104 may be implemented with silicon photonics.

As described herein, the ICG 108 and/or OCG 110 may comprise photonic structures (e.g., protrusions and/or indentations) at one or more surfaces of the waveguide 104. The photonic structures of each of the ICG 108 and OCG 110 may be formed according to suitable nanoimprint lithography methods and/or ink-jet methods. The photonic structures of each of the ICG 108 and OCG 110 may be formed on the surface(s) of the waveguide 104 (i.e., the photonic structures are not part of the waveguide 104, but instead placed on the surface(s) of waveguide 104) and/or included as part of the surface(s) of the waveguide 104. The photonic structures of each of the ICG 108 and OCG 110 may take a suitable shape or form. For example, the photonic structures may comprise one-dimensional structures (e.g., linear structures), two-dimensional structure (pillars, holes, and/or the like), metasurfaces, and/or other suitable form. In any event, the specific design of the photonic structures of ICG 108 and/or OCG 110 may be based on the optical characteristics desired for the output light of the display device 102. As described in more detail below, the ICG 108 may include photonic structures 300 arranged into unit cells designed to improve diffraction coupling efficiency and/or specular reflection coupling efficiency of the ICG 108.

The eyebox 112 may correspond to a volume of free space where the eye of the user 116 receives a view of an image created by the light output from the OCG 110. The size and location of this volume may be based on optical architecture choices in which designers trade-off a number of constraints, such as field of view (FOV), image quality, and product design.

Figure 2:
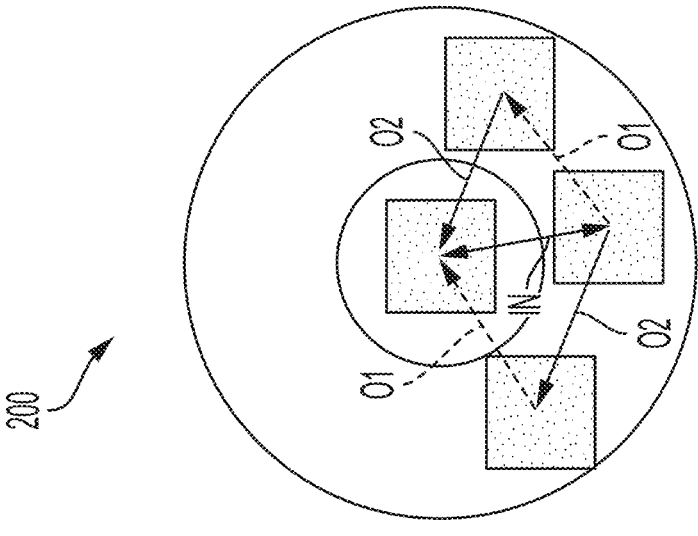
FIG. 2 illustrates a schematic view of a display device and an example of a k-space design diagram for the display device according to at least one example embodiment.
Figure 2:
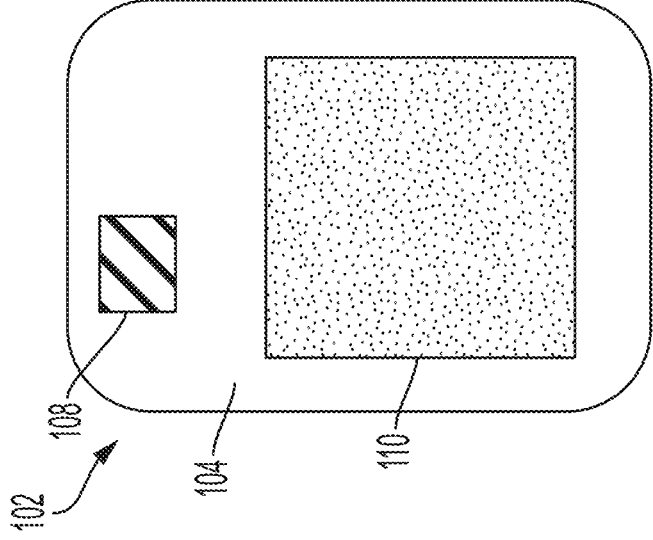

FIG. 2 illustrates a schematic view of a display device 102 and an example of a k-space design diagram for the display device 102 according to at least one example embodiment. As may be appreciated from the k-space design diagram 200, IN is the in-coupling vector for ICG 108, while O1 and O2 are the expansion and outcoupling unit vectors, respectively, for the expansion area of the waveguide and the OCG 110. As described herein, photonic structures 300 of an ICG 108 may be divided into unit cells with the photonic structures across the unit cells being arranged at a substantially same pitch P. The term "substantially" is used to account for variations in pitch P that may occur as a result of the manufacturing process. Stated another way, the photonic structures are arranged at a substantially same pitch P in that the pitch P is within manufacturing tolerances. In some cases, the pitch P is within some other acceptable deviation from a standard pitch value (e.g., within +/−5% of a standard pitch value).

Figures 3A, 3B:
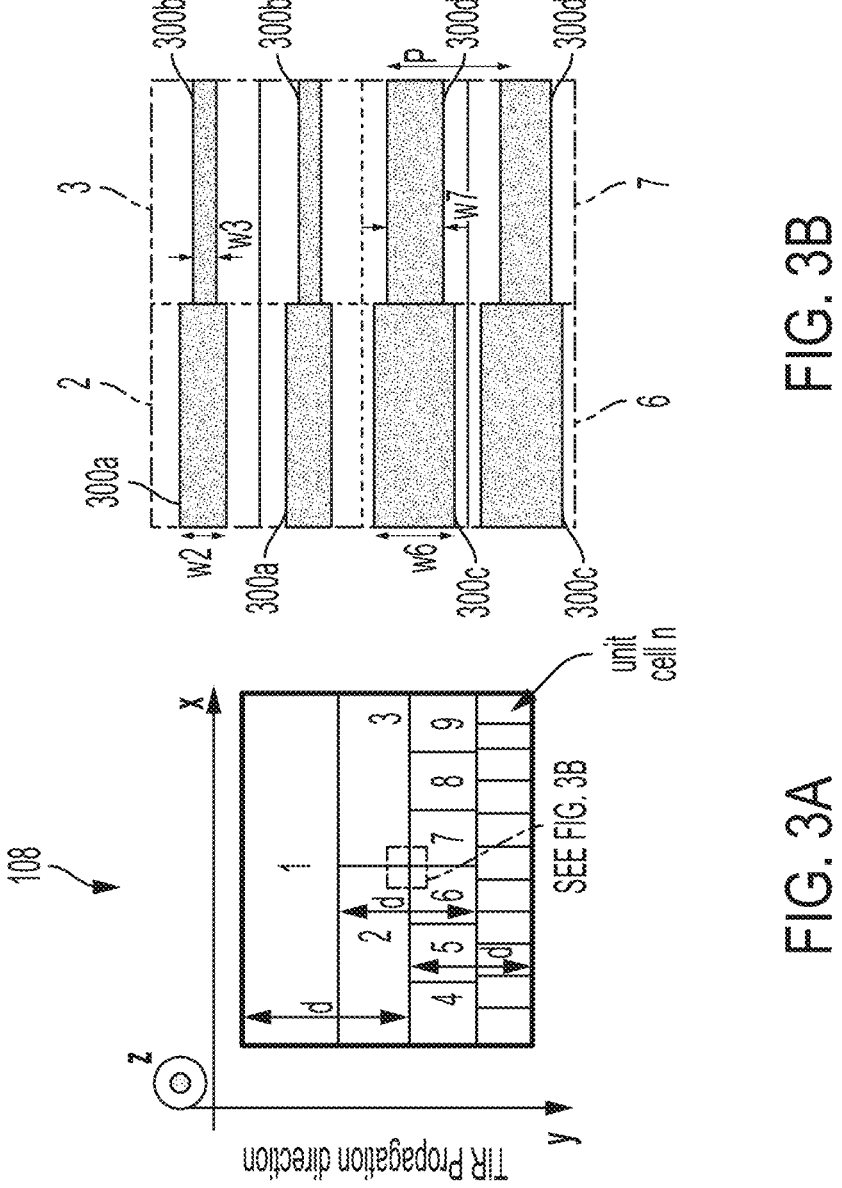
FIG. 3 illustrates an example structure for an ICG according to at least one example embodiment.

FIG. 3 illustrates an example structure for an ICG 108 according to at least one example embodiment. More specifically, FIG. 3 illustrates a schematic plan view of an ICG 108 having a rectangular shape. The ICG 108 is divided into n number of unit cells (nine labeled in FIG. 3 for the sake of illustration). In the non-limiting example of FIG. 3, the unit cells 1 to n are arranged in rows and have rectangular shapes. As shown, a number of unit cells per row may increase along a TIR propagation direction of the waveguide 108, which corresponds to a decrease in the widths (in the x-direction) of each unit cell along the TIR propagation direction. Stated another way, at least some of the unit cells 1 to n have different surface areas. FIG. 3 illustrates a non-limiting example where the surface areas of the of unit cells become smaller along a propagation direction of light (i.e., the TIR propagation direction).

FIG. 3 additionally shows distances d, which corresponds to a length along the TIR propagation direction of two adjacent unit cells. In general, each length d is selected based on a desired ratio of R1/R2 between two unit cells. Thus, the length d may be the substantially the same or vary for every two rows of unit cells.

The zoomed-in portion of FIG. 3 illustrates photonic structures 300 in unit cells 2, 3, 6, and 7 in further detail. Here, unit cell 2 includes photonic structures 300a, unit cell 3 includes photonic structures 300b, unit cell 6 includes photonic structures 300c, and unit cell 7 includes photonic structures 300d. In accordance with example embodiments, the photonic structures 300a, 300b, 300c, and 300d for each unit cell are arranged at a substantially same pitch P while having at least one different structural characteristic in each unit cell. In some examples, the pitch P is between 200 nm and 650 nm. In other examples, the pitch P is between 300 nm and 550 nm. FIG. 3 illustrates an example where the photonic structures in each unit cell differ in width along the TIR propagation direction. For example, unit cells 2, 3, 6, and 7 have photonic structures with respective widths w2, w3, w6, and w7, where w3<w2<w7<w6. However, example embodiments are not limited thereto, and the photonic structures 300 in each unit cell 1 to n may differ in one or more other structural characteristics shown and described with reference to the mutations shown in FIG. 7. In any event, the photonic structures 300 in each unit cell 1 to n have structural characteristics that improve or optimize diffraction coupling efficiency (referred to herein as $R_1$) and/or specular reflection efficiency (referred to herein as $R_2$) for that particular unit cell. Stated another way, the photonic structures 300 in each unit cell have shapes and/or sizes that are optimized for light diffracted by that particular unit cell. Thus, the shapes and/or sizes of photonic structures vary between unit cells along the TIR propagation direction.

Figures 4A, 4B:
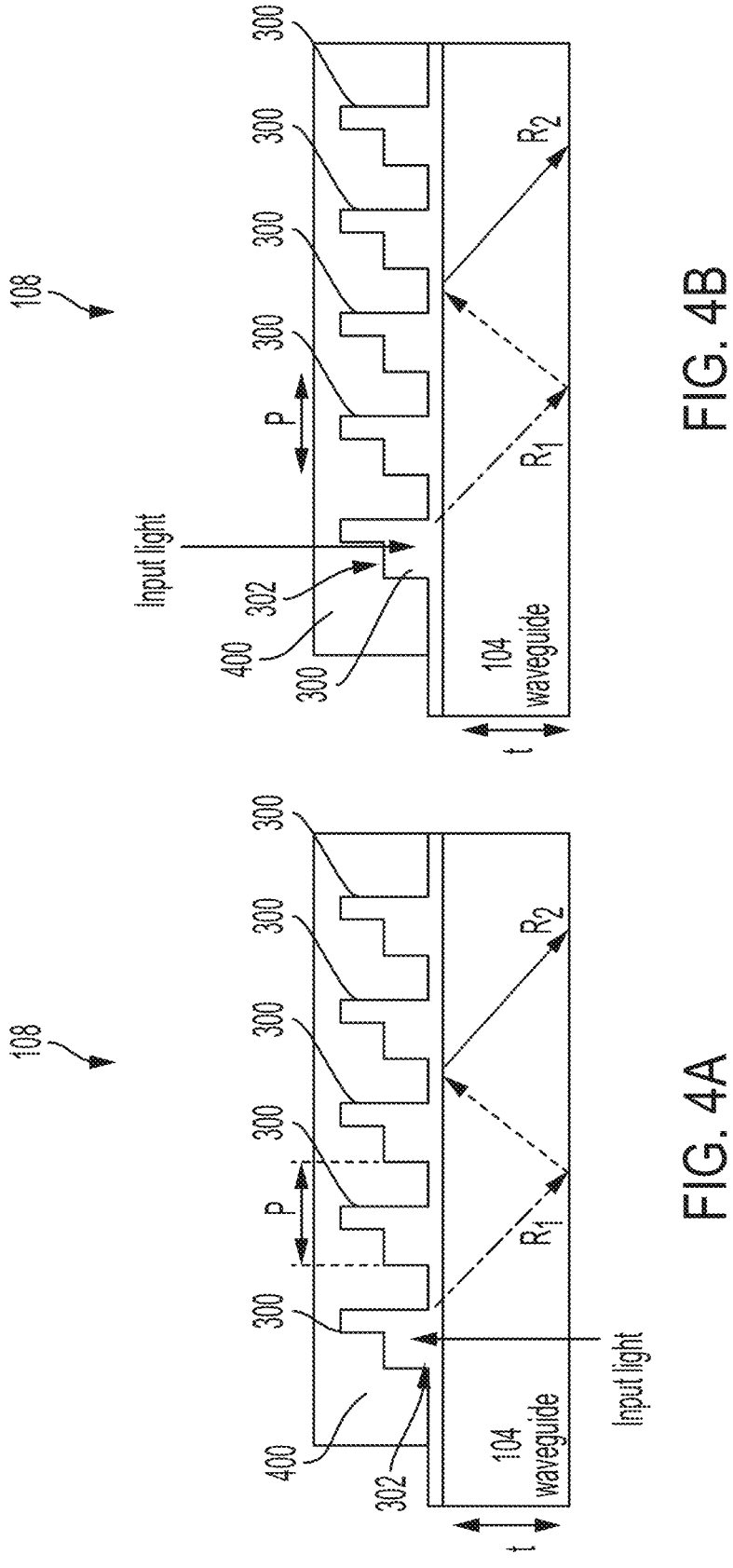
FIGS. 4A and 4B illustrates two example cross sectional views of an ICG with light being input to different sides of the ICG according to at least one example embodiment.

FIGS. 4A and 4B illustrates two example cross sectional views of an ICG 108 with light being input to different sides of the ICG 108. In FIG. 4A, light from an optical engine (e.g., an LED array) may be received by an input region 302 which corresponds to an underside of an ICG 108 having photonic structures 300 arranged in unit cell as shown in FIGS. 3 and 4, for example. In FIG. 4A, light enters the waveguide 104 before colliding with a photonic structure 300. The photonic structure 300 diffracts the light with a diffraction coupling efficiency $R_1$ and the light undergoes internal reflection (e.g., total internal reflection) in the waveguide along the TIR propagation direction. As shown, the light may experience multiple re-interactions with the photonic structures 300 as the light propagates along the TIR propagation direction. Each re-interaction of the light with photonic structures 300 has a specular reflection efficiency $R_2$ (also called re-interaction efficiency). An ICG 108 according to FIG. 4A may further include a reflective coating 400 formed over the photonic structures 300 to reflect light back into the waveguide 104. In general, a light ray reflected from a side of the waveguide 104 that does not include the ICG 108 has an efficiency that is close to the immediately preceding light ray that has already interacted with a photonic structure 300.

FIG. 4B illustrates an example where the input region 302 corresponds to an upper side of an ICG 108 that receives input light which is then diffracted into the waveguide 104 by one or more photonic structures 300 of one or more unit cells. Thereafter, the light propagates in the waveguide 104 in the same manner as that described above and has a diffractive coupling efficiency $R_1$ and specular reflection efficiency $R_2$.

Whether using the configuration of FIG. 4A or FIG. 4B, the variation $\Delta R_1$ and $\Delta R_2$ between two adjacent unit cells (i.e., unit cells that share a border) may be kept below 0.20, below 0.10, or below 0.05 for all incident angles of the k-space. Various relationships and parameters for $R_1$ and $R_2$ are discussed in more detail below.

Figure 5:
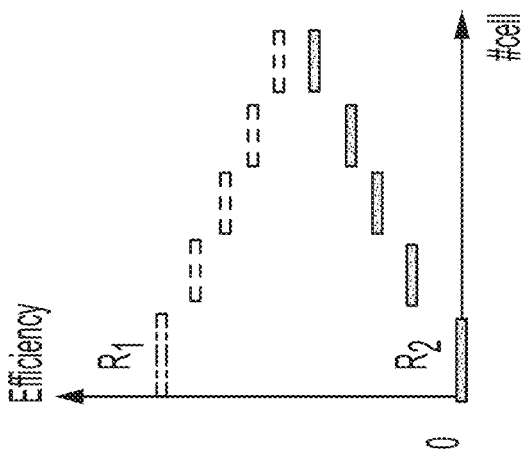
FIG. 5 illustrates another example structure for an ICG according to at least one example embodiment.
Figure 5:
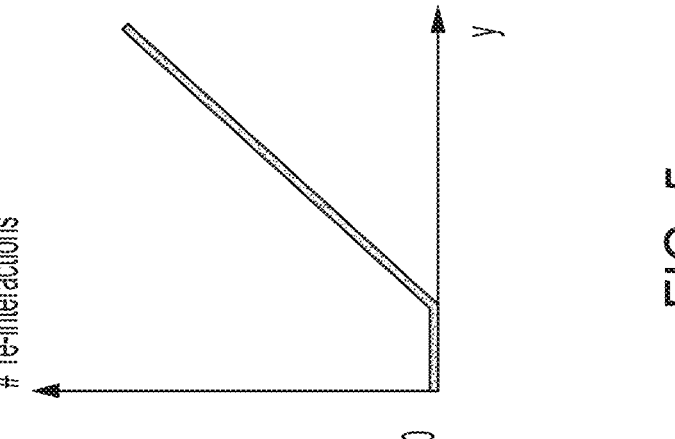
Figure 5:
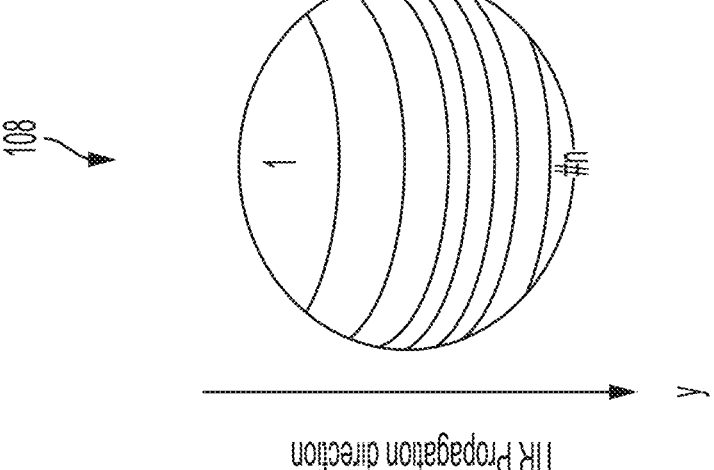

FIG. 5 illustrates another example structure for an ICG 108. More specifically, FIG. 5 illustrates a schematic plan view of an ICG 108 having a circular shape that is divided into n number of unit cells having arc shapes. As described with reference to FIG. 3, each unit cell in FIG. 5 may comprise photonic structures 300 arranged at a same pitch P in at least some or all unit cells. In addition, the photonic structures in each unit cell have at least one different structural characteristic. As shown, a width of each unit cell taken along the TIR propagation direction may gradually decrease along the TIR propagation direction. However, example embodiments are not limited to gradually decreasing widths of unit cells along the TIR propagation direction.

Figure 6:
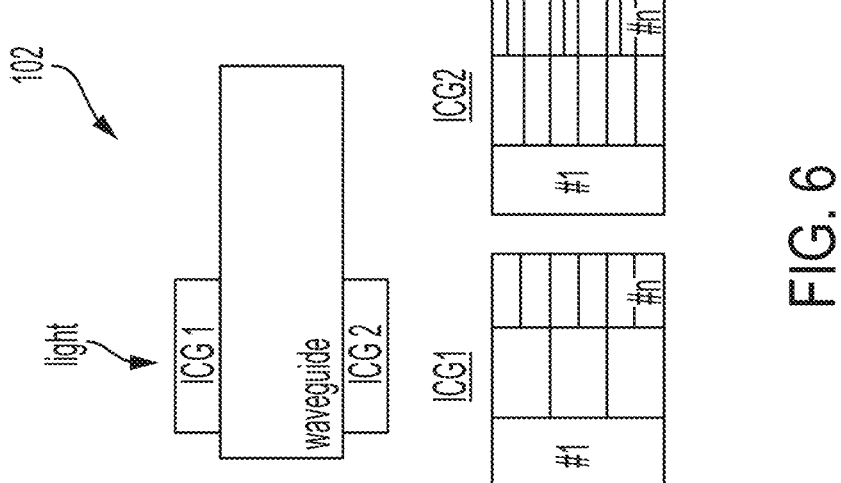
FIG. 6 illustrates schematic plan view of another example of a display device according to at least one example embodiment.

FIG. 5 further illustrates relationships for $R_1$ and $R_2$ for the circular ICG 108 as well as the relationship between a position along the TIR propagation direction and a number of re-interactions of light for a given TIR angle. For example, FIG. 6 shows how the number of re-interactions increases along the TIR propagation direction y. Initially, the light experiences no re-interaction at unit cell 1 before experiencing an increasing number of re-interactions with the photonic structures 300 as the light propagates along the TIR propagation direction. FIG. 6 additionally shows how $R_1$ decreases as the light enters a higher numbered unit cell of the circular ICG 108 while R2 increases as the light enters a higher number unit cell of the same ICG 108. Stated another way for the circular ICG 108 in FIG. 6, $R_1$ may be highest at unit cell 1 and lowest at unit cell n while R2 may be lowest at unit cell 1 (since there are no reinteractions in unit cell 1) and highest at unit cell n. The same may be true for other shapes of an ICG 108. For example, for the rectangular ICG 108 in FIG. 3A, R1 may be highest for the unit cell(s) closest to the input region for light (unit cell 1 in FIG. 3A) and lowest at a row of unit cells including unit cell n.

Here, it should be appreciated that FIG. 4A to 5 illustrate efficiencies $R_1$ and $R_2$ for a single light ray. In practice, however, many rays of light of different wavelengths are input to multiple unit cells of the ICG 108 and diffracted into the waveguide 104, with each ray having a respective $R_1$ and $R_2$ efficiency. In addition, it should be appreciated that the shape of a group of unit cells is not limited to the rectangular shape in FIG. 3 and the circular shape in FIG. 5. For example, a group of unit cells 1 to n may form another suitable shape in the plan view, such as a square, triangle, ellipsoid, and/or the like. In addition, the shape of an individual unit cell may vary from the rectangular and arced shapes shown in FIGS. 3 and 5. In at least one example, the shape of an individual unit cell matches the shape of the group of unit cells. For example, if the group of unit cells forms a triangular shape, then each unit cell may also have a triangular shape.

FIG. 6 illustrates a schematic plan view of another example of a display device 102 according to at least one example embodiment. Compared to FIG. 1, the display device 102 of FIG. 6 includes two ICGs 108 illustrated as ICG 1 and ICG 2 arranged at opposing sides of the waveguide 104. As shown, each ICG 1 and 2 comprises 1 to n unit cells, with each unit cell comprising photonic structures 300 in accordance with embodiments described herein. However, the unit cells in ICG 1 may differ from the unit cells in ICG 2 in at least one aspect. In this example, ICG 2 includes more unit cells than ICG 1. Meanwhile, the pitch P of photonic structures 300 in all or some of the unit cells in ICG 1 may be substantially the same while the pitch P of photonic structures 300 in all or some of the unit cells in ICG 2 may be substantially the same. In addition, the pitch P of the photonic structures in ICG 1 may be substantially the same or different than the pitch P of the photonic structures in ICG 2. In any event, the photonic structures 300 in each unit cell 1 to n of both ICGs 1 and 2 have structural characteristics that improve or optimize diffraction coupling efficiency (referred to herein as $R_1$) and/or specular reflection efficiency (referred to herein as $R_2$). For example, each unit cell has photonic structures 300 that optimize efficiencies $R_1$ and/or $R_2$ for that unit cell. Stated another way, the photonic structures 300 in each unit cell have shapes and/or sizes that are optimized for light diffracted by that particular unit cell. Thus, the shapes and/or sizes of photonic structures vary between unit cells along the TIR propagation direction.

Figure 7:
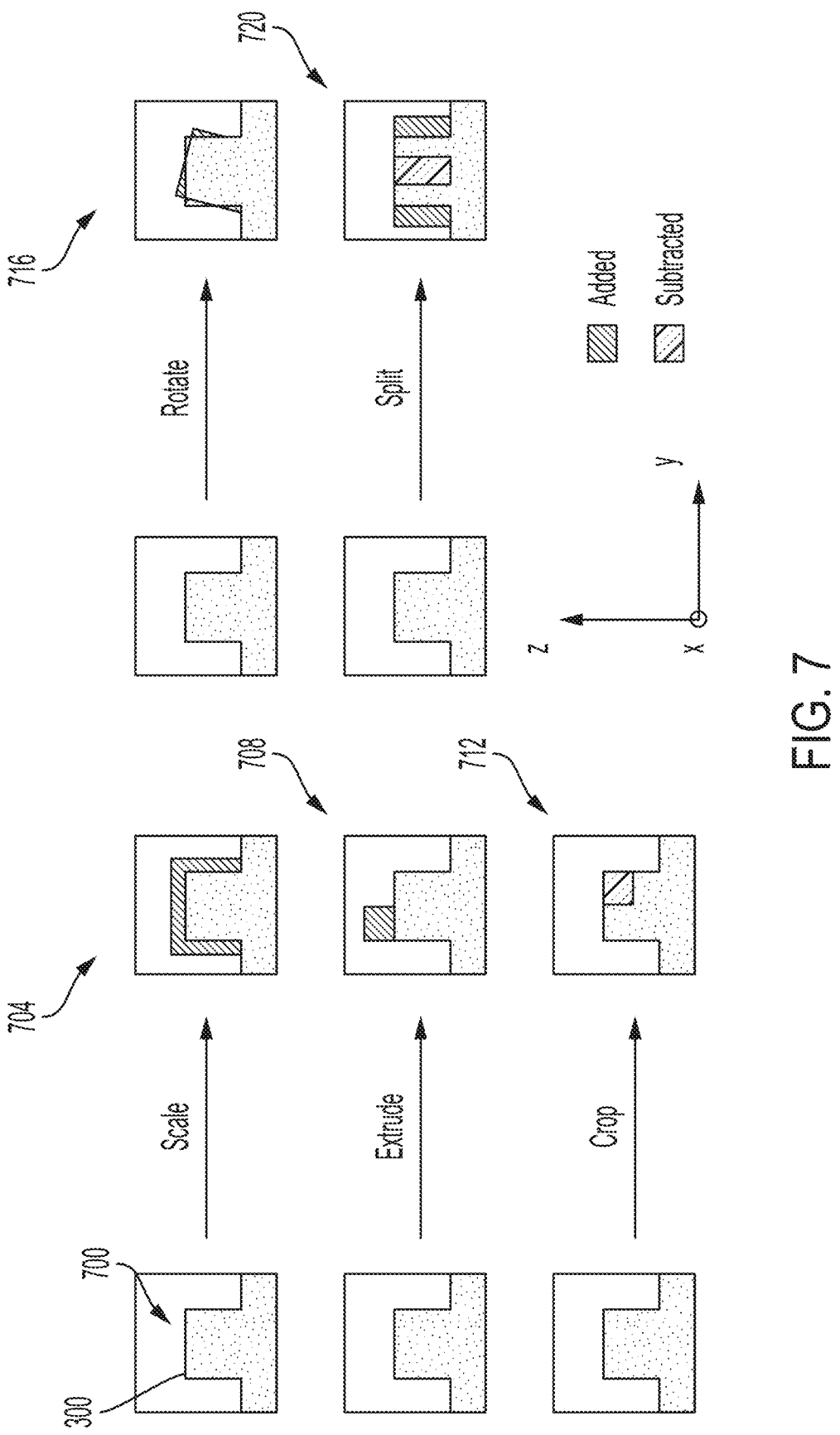
FIG. 7 illustrates a set of example mutations of a photonic structure compared to a reference shape for the photonic structure according to at least one example embodiment.

FIG. 7 illustrates a set of possible example mutations of a photonic structure compared to a reference shape according to at least one example embodiment. As described above, each unit cell 1 to n of an ICG 108 includes photonic structures 300 arranged at a pitch P with the photonic structures 300 of at least one of the unit cells having at least one different structural characteristic than the photonic structures 300 of at least one other unit cell. FIG. 7 illustrates an example where the at least one different structural characteristic corresponds to the photonic structures in different unit cells having different shapes compared to a reference shape.

In more detail, FIG. 7 illustrates cross-sectional views of a photonic structure 300 having a reference shape 700 and shapes 704, 708, 712, 716, and 720 that are different from the reference shape in at least one aspect. In general, FIG. 7 illustrates additions, subtractions, and/or rotations to the reference shape 700 to arrive at shapes 704, 708, 712, 716, and 720. Additions to the reference shape 700 include changing the scale of the reference shape 700 to arrive at shape 704 that has at least one different dimension than the reference shape 700. For example, shape 704 comprises a larger height and width than the reference shape 700. However, example embodiments are not limited thereto, and shape 704 may comprise a different width and a same height as the reference shape 700 or a different height and a same width as the reference shape 700. In some examples, an addition to the reference shape 700 may comprise an extrusion added to the reference shape 700 to arrive at shape 708. In other examples, a subtraction to the reference shape 700 includes a crop of the reference shape 700 to arrive at shape 712 or a split of the reference shape 700 to arrive at shape 720. As may be appreciated, shape 720 is formed by subtracting part of the reference shape 700 and adding the subtracted part of the reference shape 700 to another region of the reference shape 700 (shown in FIG. 7 as a subtraction of the middle section of the reference shape 700 with an addition of the subtracted section to outer sides of the pillars formed by the subtraction). In at least one additional example, the reference shape 700 is rotated by a non-zero angle to arrive at shape 716. An amount of rotation of shape 716 compared to the reference shape 700 may vary according to design of the ICG 108.

In at least one embodiment, each unit cell 1 to n of an ICG 108 may comprise a set of photonic structures 300 having the reference shape 700 or photonic structures 300 with one of the mutations in shapes 704, 708, 712, 716, or 720. In one example, a unit cell comprises photonic structures 300 that have more than one mutation compared to the reference shape 700. For example, a unit cell may comprise photonic structures 300 with a maximum of three mutations compared to the reference shape 700 (e.g., the photonic structures 300 of a unit cell may have a shape that includes the additions of shape 704 and 708 and the rotation of shape 716).

Although FIG. 7 illustrates the reference shape 700 as a rectangle the reference shape 700 may comprise other suitable reference shapes which can be modified in the same or similar manner with additions, subtractions, and/or rotations. Other suitable reference shapes include a triangular shape, a square shape, a rhombus shape, a trapezoid shape, an irregular polygon shape, a regular polygon shape and/or the like.

As described herein, the design of the photonic structures 300 may be achieved by a combination of the mutations in the (y,z) axis as shown in FIG. 7, whereas the photonic structures 300 are constant in the x axis within the ICG boundaries. Photonic structures 300 may have a critical dimension sized between 5 nm and 1000 nm or between 20 nm and 600 nm, and a total number of mutation changes between unit cells sharing a border may be limited to three.

In view of the instant description and at least FIGS. 1-7, it should be appreciated that embodiments relate to an architecture of ICGs that have photonic structures 300 with customized variations to control and optimize the input light coupling efficiency and color multiplexing of the ICG. As noted herein, an ICG 108 is sub-divided into n number of unit cells each containing a set of photonic structures 300 that have same structural characteristics, where at least one structural characteristic differs for the photonic structures 300 in neighboring unit cells. The photonic structures 300 in each unit cell may be designed to control the intensity distribution across multiple orders of light for that specific unit cell. The unit cells may be arranged in two-dimensional array. The pitch P of the photonic structures 300 that makeup the main diffractive grating is kept substantially constant and substantially identical in all the unit cells in order to preserve one given k vector space (see FIG. 2) for a given operating wavelength or range of wavelengths that correspond to a particular color. The shapes (square, triangle, rectangle, circle, ellipsoid, etc.) and sizes of each unit cell are tuned to improve or optimize the efficiency and/or uniformity of the image outcoupling by the OCG 110. As described above, an ICG 108 may be composed of one grating element on a side of the waveguide 104 or of two grating elements distributed on opposite sides the waveguide 104.

Conditions for defining the optical properties and/or structural characteristics of each unit cell are discussed in more detail below. The ICG architecture proposed by example embodiments simultaneously tunes 1) the efficiency of diffraction coupling $R_1$ and efficiency of re-interaction coupling $R_2$, and 2) the spectral efficiencies of color multiplexing. Parameters for tuning efficiencies $R_1$, $R_2$, and color multiplexing are described below.

Tuning $R_1$ for the majority of angles in the field of view (FOV) and for all wavelengths (but optimized for one specific wavelength, e.g., green wavelengths) is discussed below. In general, $\Delta R_1 = |R_1{}^n - R_1{}^{n+k}|$ for two adjacent unit cells n and n+k that share a common border. In at least one embodiment, $\Delta R_1 \leq 1 - (1-0.25)^{(d/0.5)}$, where d is the length along the light propagation axis of two adjacent unit cells (see d in FIG. 3). This rule for $\Delta R_1$ keeps the relative drop ratio of $R_1$ to be less than 25% per 0.5 mm. For a general eye pupil size (distance d) of 3 mm, the $R_1$ difference from edge to edge of the n and n+k unit cells is expressed by $\Delta R_1 = 1 - (1-0.25)^{(3/0.5)} \approx 0.82$, which corresponds to a maximum decrease in intensity of 82%, which is similar to a maximum decrease of 50% in perceived brightness or intensity. Stated another way, this rule for $\Delta R_1$ is based on the assumption that an illuminance distribution within a 3 mm pupil size should have no more than a 50% perceived drop in illuminance along the TIR direction, where a 50% perceived drop in illuminance corresponds to an actual 82% drop in illuminance. As may be appreciated, other thresholds for perceived drops in illuminance distribution may be used, which will have a corresponding effect on the equation for $\Delta R_1$.

Tuning the re-interaction coupling efficiency $R_2$ will now be discussed. The efficiencies ($R_1''$, $R_2''$) of a unit cell at a given propagation angle of light may be tuned according to the unit cell's position in the ICG 108 in order to increase the contribution of $R_2$ to the total coupling efficiency in the areas of the ICG 108 where the number of re-interactions is higher (see FIG. 5). The number of re-interactions "NR" of the TIR input light beams to the ICG 108 increases along the light propagation direction according to the formula NR=[L/(2t*tan θ)] with L being a length of ICG 108 along the TIR propagation direction (or L being a diameter of a circular ICG 108), t being a thickness of the waveguide 104, and θ being the propagation angle of light within the waveguide 104. In at least one embodiment, the specular reflection efficiency $R_2$ has the following relationship for unit cells n and n+1 that share a border in an ICG 108: $R_2''^{n+1} > R_2''$.

Figure 8:
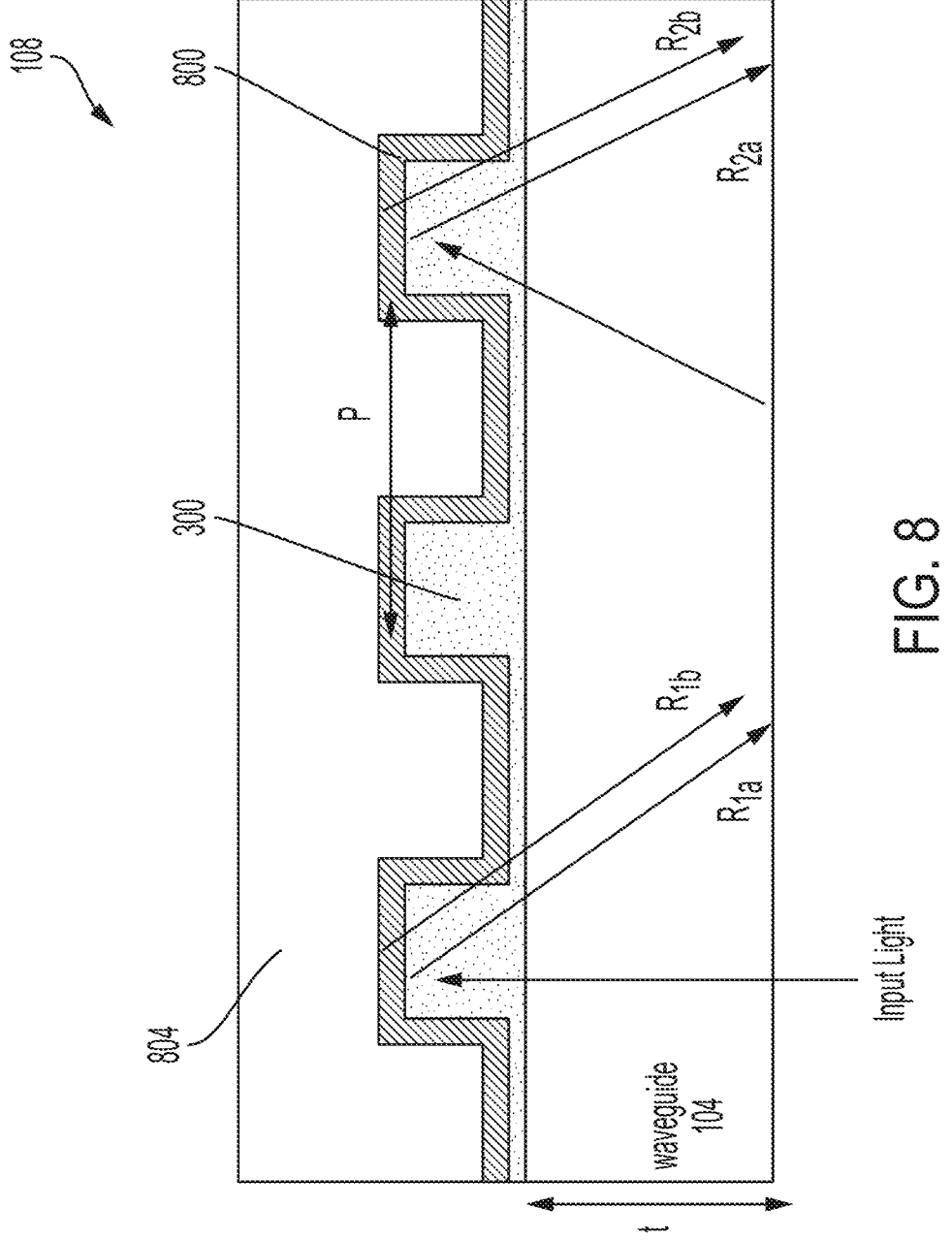
FIG. 8 illustrates an ICG including an additional high refractive index coating according to at least one example embodiment.

($R_1''$, $R_2''$) for a unit cell n may be tuned 1) by controlling the shape of the photonic structures 300 in each individual unit cell (see FIG. 7), and 2) by using an additional high refractive index coating 800 on the top of the ICG 108 as shown in FIG. 8. As described herein, the pitch P of the photonic structures 300 across an ICG 108 is kept substantially constant and substantially identical for all the unit cells given a color centered around the wavelength $\lambda_n$.

In the case of a reflective ICG 108 which receives light from an underside of the ICG, the high refractive index coating 800 may be an interlayer between the ICG grating with photonic structures 300 and the reflective coating 804. Each interface between the ICG grating layer and layer 800 and between layer 800 and layer 804 has a respective efficiency curve $R_{1a}$, $R_{1b}$ and $R_{2a}$, $R_{2b}$, and the refractive indices of these layers may satisfy the following conditions: $\Delta n^2_{0,1} \gg 0$, $\Delta n^2_{1,2} \gg 0$ and $\Delta n^2_{1,2} > \Delta n^2_{0,1}$ with $n_{0,1,2}$ being the complex refractive index of the ICG grating, layer 800, and layer 804, respectively. For example, $\Delta n^2_{0,1} > 0.2$ and $\Delta n^2_{1,2} > 50$ (e.g., where ICG grating includes a resist, layer 800 includes TiO2, and layer 804 includes Al). Each of the ICG grating, layer 800, and layer 804 may comprise multiple layers that have an effective complex refractive index used for $n_{0,1,2}$. The ICG grating layer with photonic structures 300 and layer 800 may each comprise a polymer, inorganic material, or a hybrid material with organic material and inorganic material, and each layer may have a refractive index between 1.3 and 2.4 or between 1.5 to 2.0 and low absorption properties in the visible light spectrum. Meanwhile, layer 804 may comprise a highly reflective material such as metal (e.g., Al, Ag, Au, and/or the like). The thicknesses of layers 800 and 804 may be used to tune the ratio $R_1''/R_2''$. In at least one example, a thickness of layer 800 is between 5 nm to 400 nm or between 5 nm to 200 nm. A thickness of layer 804 may be between 30 nm to 2000 nm or between 50 nm to 800 nm.

Figure 9:
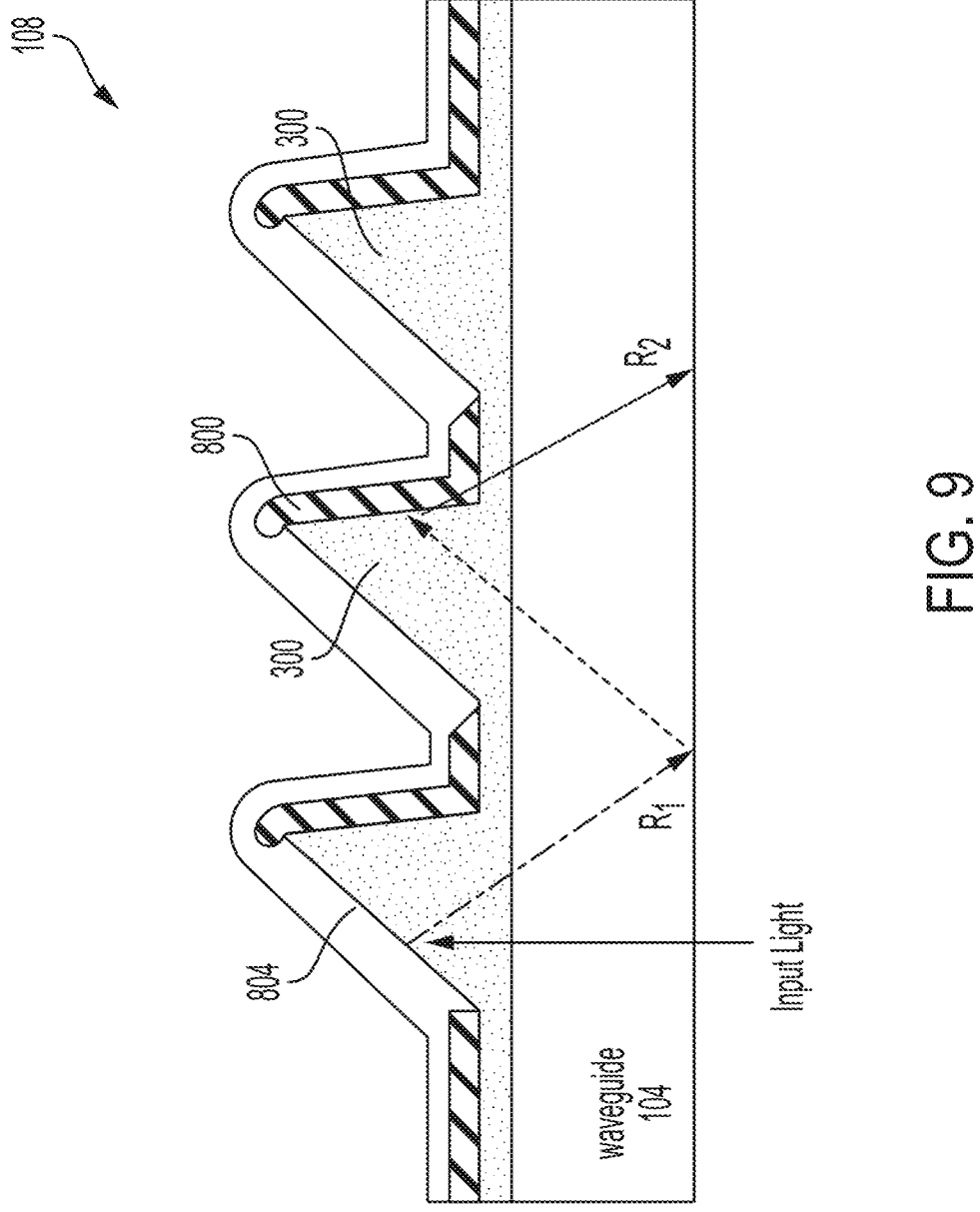
FIG. 9 illustrates a modification of the structure in FIG. 8 according to at least one example embodiment.

For photonic structures 300 with a blazed, slanted, and/or staircase structure, the coatings 800 and 804 may be applied selectively. For example, as shown in FIG. 9, layer 800 may be formed in segments along the photonic structures 300 on the anti-blazed angle. Meanwhile, layer 804 is formed on the blazed angle of the photonic structures 300. This selective formation of layers 800 and 804 may be beneficial for achieving high $R_1$ and $R_2$. In at least one example, layers 800 and 804 have thickness variation over the grating. For example, layer 800 may have a thicker coating (e.g., 200 nm) on the bottom flat portion between structures 300 and on tips of the structures 300 and a thinner coating (e.g., 50 nm) on the anti-blazed angle. In another configuration, placement of the thicker and thinner coatings for layer 800 may be reversed. Additionally or alternatively, layer 800 may have thickness variation over the anti-blazed angle, such as a continuous thickness increase or decrease from a top to a bottom of a photonic structure 300. The same variations described above for layer 800 may also be applied to layer 804. As described herein, optical properties of layer 800 and/or layer 804 are selected to achieve improved or maximal $R_1$ and $R_2$.

Figures 10A, 10B:
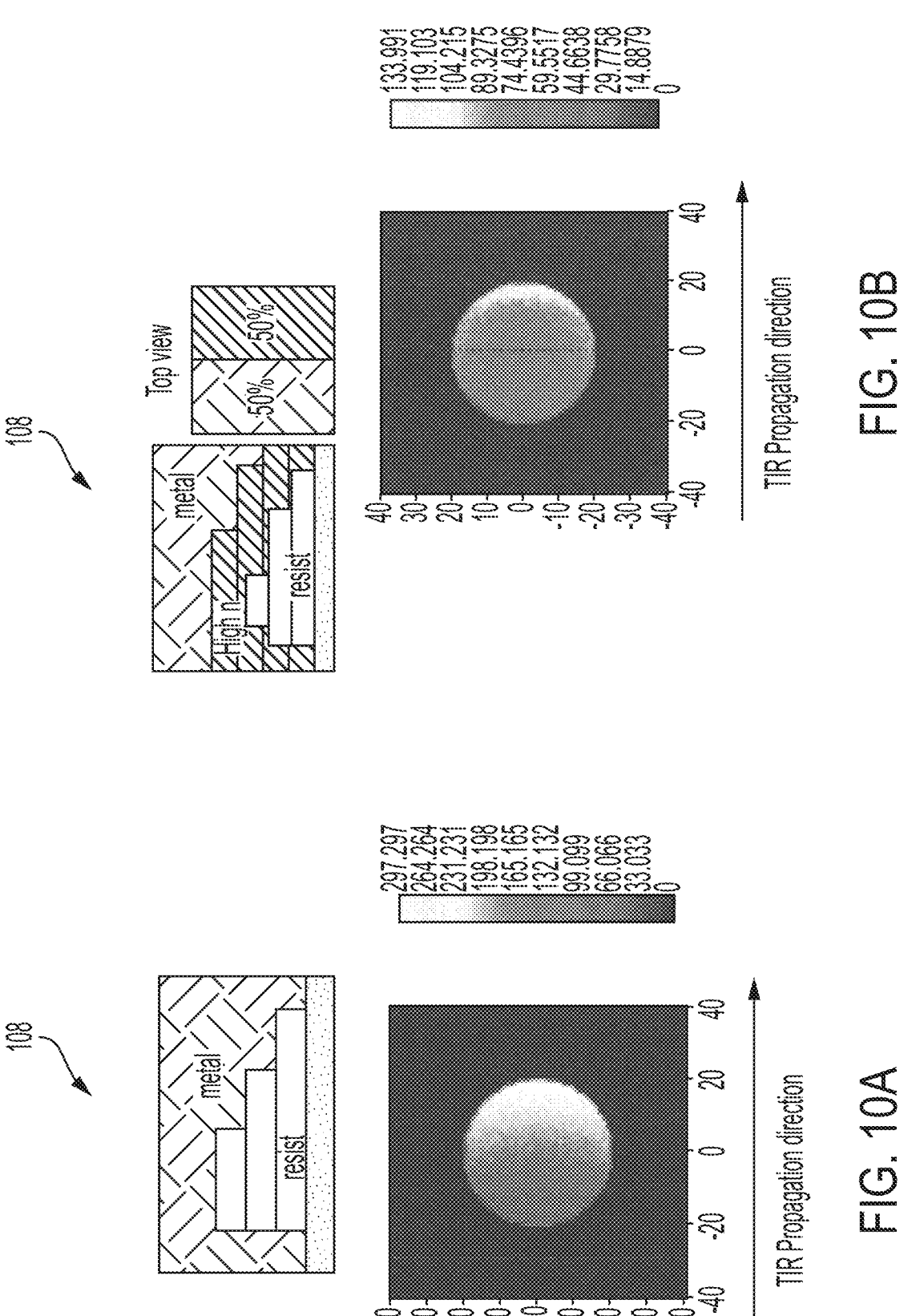
FIGS. 10A and 10B illustrate efficiencies of two example circular ICGs according to at least one example embodiment.

FIGS. 10A and 10B illustrate efficiencies of two example circular ICGs 108 with a 3 mm diameter having a staircase resist grating (where a section of resist corresponds to a photonic structure 300). In each of FIGS. 10A and 10B, the resist may have a complex refractive index of n=1.7 and k=2e-03 and a reflective metal coating, such as layer 804, with a complex refractive index of n=0.9, k=6.5. FIG. 10B differs from FIG. 10A in that the ICG 108 of FIG. 10B further includes a high refractive index coating such as layer 800 formed on the resist. This high refractive index coating may have a complex refractive index of n=2.4, k=4e-04. As shown in FIG. 10B, the high n coating being deposited on 50% of the grating from FIG. 10A (e.g., the right half of the grating). FIG. 10B further differs from FIG. 10A in that the grating in FIG. 10B with the high-n coating 800 has an upper left part of the resist cropped according to a mutation illustrated in FIG. 7. As may be appreciated from the respective efficiency charts in FIGS. 10A and 10B, the illuminance distribution of the ICG 108 in FIG. 10B is more uniform than in FIG. 10A due to the modifications of FIG. 10B.

Figure 11:
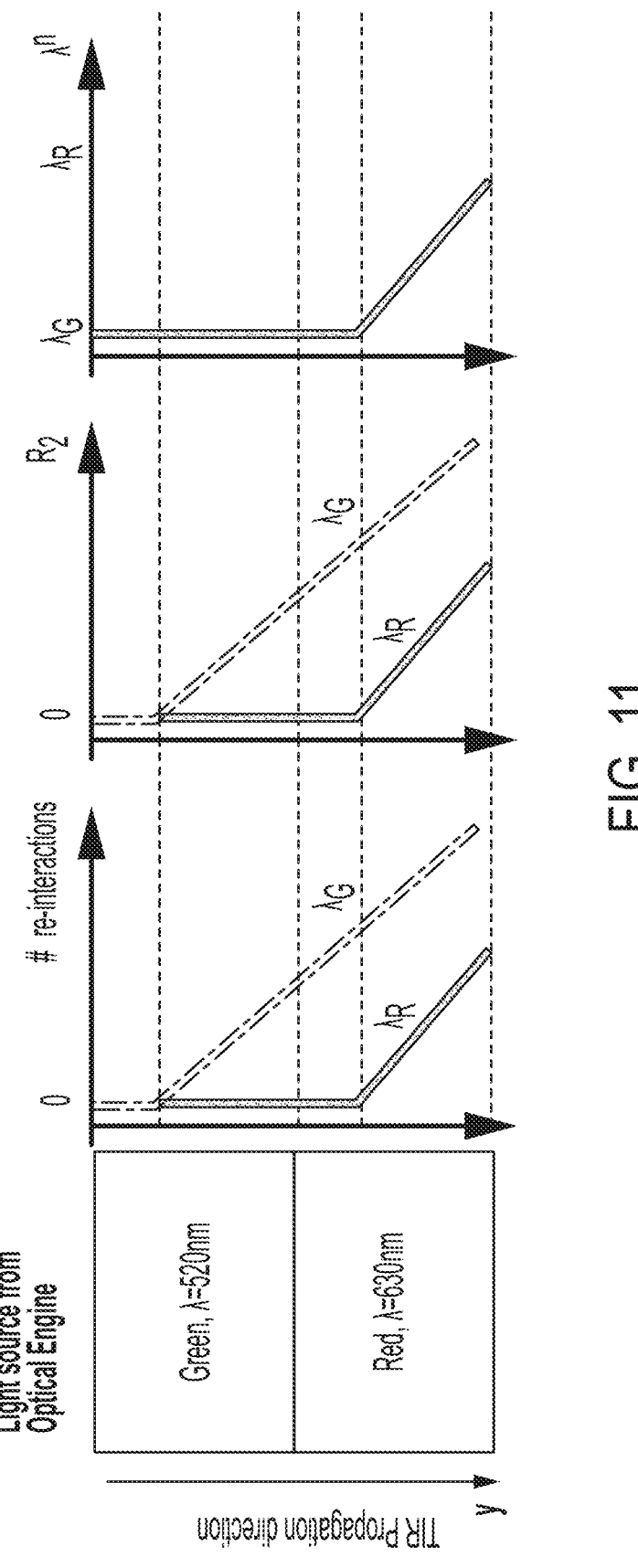
FIG. 11 illustrates graphics for explaining the tuning of spectral efficiencies for color multiplexing according to at least one example embodiment.

Tuning spectral efficiencies for color multiplexing will now be discussed with reference to FIG. 11. In the configuration where a single ICG 108 is used for color multiplexing of two or more wavelengths, the efficiencies of the unit cells ($R_1''$, $R_2''$) of the ICG 108 may be optimized for a specific color wavelength $\lambda^n$, with $\lambda^n \varepsilon [\lambda_{min}, \lambda_{max}]$ where $\lambda_{min}$ and $\lambda_{max}$ are the minimum and maximum wavelength of the optical engine's (light source's) input spectrum range, respectively. The final uniformity of the output light is considered for optimization of ($R_1''$, $R_2''$). Assuming the pitch P of photonic structures 300 of an ICG 108 is kept identical for all the cells according to k-space and the photonic structures 300 are designed with the same rules noted above for optimizing or improving efficiencies $R_1$ and $R_2$, FIG. 11 illustrates why the unit cells and photonic structures 300 of an ICG may be optimized for green wavelengths instead of red wavelengths. As shown, green wavelengths undergo more re-interactions with the photonic structures 300 than red wavelengths for a given TIR angle, and thus, selecting the parameters of unit cells and photonic structures 300 with green wavelengths in mind is more desirable since $R_2$ of green wavelengths contributes more to the overall light distribution of the ICG 108 than $R_2$ of the red wavelengths. As may be appreciated, the distribution of in the area where there are re-interactions for both green and red wavelengths can vary according to the input profile of the optical engine and the output light profile associated to the transfer function of the waveguide 104 (e.g., pupil replication and out-coupling).

FIG. 12 illustrates a schematic view of a head mounted display (HMD) 1300 according to at least one example embodiment.

The HMD 1300 may include a wearable frame 10 that supports elements of the HMD 1300, hinges 11 at ends 10A of the frame 10 that enable movement of temple portions 12 that hold the HMD 1300 to the head of an observer 40, ear pieces 13 that removably mount to ears of the observer 40, nose pads 14, wiring 15 that connects to an external processing circuit (not shown) where image processing operations are carried out, for example, on the basis of output from camera 18. The HMD 1300 may further include headphones 16, headphone wirings 17, an image sensor or camera 18 mounted to a face 10B of the frame 10 in a central portion 10C of the frame 10, a member 20 to which image generating devices 111A and 111B are mounted through, for example, a casing 113, and waveguides 104 that rest in front of pupils 41 of the observer 40 when wearing the HMD 1300. As may be appreciated, the image generating devices 111A and 111B may each include an optical system for providing input light to a respective waveguide 104. The optical system for each image generating device 111A and 111B may include one or more light sources, one or more lenses, one or more prisms or mirrors, one or more light modulators, and/or other suitable elements for generating input light for a waveguide 104. Each waveguide 104 take the form of one or more of the waveguides 104 discussed above with reference to FIGS. 1 to 12 and receive the input light shown in FIG. 1 from one of the image generating devices 111A and 111B. For example, one or more of the mechanisms from FIGS. 3A to 12D may be applied to form a waveguide 104.

Here, it should be appreciated that the above described details relate to one non-limiting example of an HMD 1300, and the HMD 1300 may include more or fewer elements than those illustrated and described above.

The embodiments described with reference to FIGS. 1-12 may be combined with one another in any suitable manner.

While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Any processing devices, control units, processing units, etc. discussed above may correspond to one or many computer processing devices, such as a Field Programmable Gate Array (FPGA), an Application-Specific Integrated Circuit (ASIC), any other type of Integrated Circuit (IC) chip, a collection of IC chips, a microcontroller, a collection of microcontrollers, a microprocessor, Central Processing Unit (CPU), a digital signal processor (DSP) or plurality of microprocessors that are configured to execute the instructions sets stored in memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as an embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

It should be appreciated that inventive concepts cover any embodiment in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C" "A B, and/or C," and "A, B, or C" means A alone, B alone, >>C alone, A and B together, A and C together, B and C together, or A, B and C together.

Various aspects of the present disclosure are described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Example embodiments may be configured according to the following:

(1) An input coupling grating (ICG) for a waveguide-based display, the ICG comprising:
an input region that receives light; and
a plurality of unit cells, each unit cell including photonic structures arranged at a pitch,
wherein the photonic structures of at least one first unit cell have at least one different structural characteristic than the photonic structures of at least one second unit cell.

(2) The ICG of (1), wherein the pitch is substantially the same for the photonic structures of at least two unit cells.

(3) The ICG of one or more of (1) to (2), wherein the pitch is substantially the same for the photonic structures of all of the plurality of unit cells.

(4) The ICG of one or more of (1) to (3), wherein the at least one different structural characteristic corresponds to the photonic structures in the at least one first unit cell having a different shape than the photonic structures in the at least one second unit cell.

(5) The ICG of one or more of (1) to (4), wherein the photonic structures in the at least one first unit cell have a reference shape, and wherein the photonic structures in the at least one second unit cell have an addition to the reference shape, a subtraction from the reference shape, or both.

(6) The ICG of one or more of (1) to (5), wherein the addition to the reference shape includes an extrusion added to the reference shape.

(7) The ICG of one or more of (1) to (6), wherein the subtraction to the reference shape includes a crop of the reference shape or a split of the reference shape.

(8) The ICG of one or more of (1) to (7), wherein the photonic structures in the at least one first unit cell have a reference shape, wherein the different shape corresponds to a rotation of the reference shape.

(9) The ICG of one or more of (1) to (8), wherein the at least one different structural characteristic corresponds to the photonic structures in the at least one first unit cell having a different dimension than the photonic structures in the at least one second unit cell.

(10) The ICG of one or more of (1) to (9), wherein the different dimension corresponds to a different width, a different height, or both.

(11) The ICG of one or more of (1) to (10), wherein at least some of the plurality of unit cells have different surface areas.

(12) The ICG of one or more of (1) to (11), wherein the surface areas of the plurality of unit cells become smaller along a propagation direction of light.

(13) The ICG of one or more of (1) to (12), further comprising:
a reflective coating on the photonic structures of the plurality of unit cells; and
a diffractive coating between the reflective coating and the photonic structures.

(14) The ICG of one or more of (1) to (13), wherein the diffractive coating comprises separate diffractive coating segments.

(15) A waveguide-based display, comprising:
a waveguide;
at least one input coupling grating (ICG) coupled to the waveguide and including:
an input region that receives light; and
a plurality of unit cells, each unit cell including photonic structures arranged at a pitch, wherein the photonic structures of at least one first unit cell have at least one different structural characteristic than the photonic structures of at least one second unit cell; and
an output coupling grating (OCG) coupled to the waveguide that outputs light to an eyebox.

(16) The waveguide-based display of (15), wherein the pitch is substantially the same for the photonic structures of all of the plurality of unit cells.

(17) The waveguide-based display of one or more of (15) to (16), wherein the at least one different structural characteristic corresponds to the photonic structures in the at least one first unit cell having a different shape than the photonic structures in the at least one second unit cell.

(18) The waveguide-based display of one or more of (15) to (17), wherein the photonic structures in the at least one first unit cell have a reference shape, wherein the different shape corresponds to a rotation of the reference shape.

(19) The waveguide-based display of one or more of (15) to (18), wherein the at least one different structural characteristic corresponds to the photonic structures in the at least one first unit cell having a different dimension than the photonic structures in the at least one second unit cell.

(20) An input coupling grating (ICG) for a waveguide-based display, the ICG comprising:
an input region that receives light; and
a plurality of photonic structures arranged at a substantially same pitch and divided into unit cells, wherein at least one structural characteristic of photonic structures in a unit cell differs compared to photonic structures in other unit cells.

Any one or more of the aspects/embodiments as substantially disclosed herein.

Any one or more of the aspects/embodiments as substantially disclosed herein optionally in combination with any one or more other aspects/embodiments as substantially disclosed herein. One or more means adapted to perform any one or more of the above aspects/embodiments as substantially disclosed herein.

What is claimed is:

1. An input coupling grating (ICG) for a waveguide-based display, the ICG comprising:
    a surface that receives light;
    a plurality of unit cells at the surface, each unit cell including photonic structures arranged at a pitch, wherein the photonic structures of at least one first unit cell have at least one different structural characteristic than the photonic structures of at least one second unit cell, wherein a width of each unit cell gradually decreases along a propagation direction of the light, wherein the width of each unit cell is measured in the propagation direction;
    a reflective coating on the photonic structures of the plurality of unit cells; and
    a diffractive coating between the reflective coating and the photonic structures,
    wherein the at least one different structural characteristic corresponds to the photonic structures in the at least one first unit cell having a different shape than the photonic structures in the at least one second unit cell, wherein the photonic structures in the at least one first unit cell have a reference shape, and wherein the photonic structures in the at least one second unit cell have an addition to the reference shape, a subtraction from the reference shape, or both.

2. The ICG of claim 1, wherein the pitch is substantially the same for the photonic structures of at least two unit cells.

3. The ICG of claim 1, wherein the pitch is substantially the same for the photonic structures of all of the plurality of unit cells.

4. The ICG of claim 1, wherein the light is transmitted via internal reflection along the propagation direction to an output coupling grating.

5. The ICG of claim 1, wherein the addition to the reference shape includes an extrusion added to the reference shape.

6. The ICG of claim 1, wherein the subtraction to the reference shape includes a crop of the reference shape or a split of the reference shape.

7. The ICG of claim 1, wherein the different shape corresponds to a rotation of the reference shape.

8. The ICG of claim 1, wherein the at least one different structural characteristic corresponds to the photonic structures in the at least one first unit cell having a different scale than the photonic structures in the at least one second unit cell.

9. The ICG of claim 1, wherein the diffractive coating comprises separate diffractive coating segments.

10. A waveguide-based display, comprising:
    a waveguide comprising a surface that receives light, wherein the waveguide transmits the light via internal reflection along a propagation direction;

at least one input coupling grating (ICG) coupled to the waveguide and including:
        a plurality of unit cells at the surface, each unit cell including photonic structures arranged at a pitch, wherein the photonic structures of at least one first unit cell have at least one different structural characteristic than the photonic structures of at least one second unit cell, wherein the at least one different structural characteristic corresponds to the photonic structures in the at least one first unit cell having a different shape than the photonic structures in the at least one second unit cell, wherein the photonic structures in the at least one first unit cell have a reference shape, and wherein the photonic structures in the at least one second unit cell have an addition to the reference shape, a subtraction from the reference shape, or both, wherein a width of each unit cell gradually decreases along the propagation direction, and wherein the width of each unit cell is measured in the propagation direction;
        a reflective coating on the photonic structures of the plurality of unit cells; and
        a diffractive coating between the reflective coating and the photonic structures; and
    an output coupling grating (OCG) that outputs the light that has traveled from the ICG along the propagation direction to an eyebox.

11. The waveguide-based display of claim 10, wherein the pitch is substantially the same for the photonic structures of all of the plurality of unit cells.

12. The waveguide-based display of claim 10, wherein the different shape corresponds to a rotation of the reference shape.

13. The waveguide-based display of claim 10, wherein the at least one different structural characteristic corresponds to the photonic structures in the at least one first unit cell having a different scale than the photonic structures in the at least one second unit cell.

14. An input coupling grating (ICG) for a waveguide-based display, the ICG comprising:
    a waveguide comprising surface that receives light, wherein the waveguide transmits the light via internal reflection along a propagation direction from the ICG to an output coupling grating;
    a plurality of photonic structures arranged at the surface at a substantially same pitch and divided into unit cells, wherein a shape of photonic structures in a first unit cell of the unit cells differs compared to a shape of photonic structures in a second unit cell of the unit cells, wherein the photonic structures in the first unit cell have a reference shape, and wherein the photonic structures in the second unit cell have an addition to the reference shape, a subtraction from the reference shape, or both, wherein a width of each unit cell gradually decreases along the propagation direction of the light, and wherein the width of each unit cell is measured in the propagation direction;
    a reflective coating on the photonic structures of the unit cells; and
    a diffractive coating between the reflective coating and the photonic structures.

* * * * *